United States Patent
Miyasaka

(10) Patent No.: US 11,515,766 B2
(45) Date of Patent: Nov. 29, 2022

(54) MANUFACTURING METHOD OF ELECTRIC PUMP

(71) Applicant: SHINANO KENSHI CO., LTD., Ueda (JP)

(72) Inventor: Takeshi Miyasaka, Nagano (JP)

(73) Assignee: SHINANO KENSHI CO., LTD., Ueda (JP)

(*) Notice: Subject to any disclaimer, the term of this patent is extended or adjusted under 35 U.S.C. 154(b) by 215 days.

(21) Appl. No.: 17/098,710

(22) Filed: Nov. 16, 2020

(65) Prior Publication Data

US 2021/0257890 A1    Aug. 19, 2021

(30) Foreign Application Priority Data

Feb. 13, 2020    (JP) .............................. JP2020-022039

(51) Int. Cl.
*H02K 15/00* (2006.01)
*F04D 13/06* (2006.01)
*H02K 3/52* (2006.01)

(52) U.S. Cl.
CPC ..... *H02K 15/0062* (2013.01); *F04D 13/0693* (2013.01); *H02K 3/522* (2013.01); *H02K 2203/09* (2013.01); *Y10T 29/49009* (2015.01)

(58) Field of Classification Search
CPC .. H02K 5/12; H02K 2203/06; H02K 11/0094; H02K 15/0056; H02K 15/0062; H02K 9/197; Y10T 29/49009
USPC .......... 29/596, 598, 605, 606, 607, 732, 736
See application file for complete search history.

(56) References Cited

U.S. PATENT DOCUMENTS

| | | | |
|---|---|---|---|
| 9,742,232 B2* | 8/2017 | Honda | ..................... H02K 3/28 |
| 10,063,125 B2 | 8/2018 | Jang et al. | |
| 10,148,143 B2 | 12/2018 | Otsubo et al. | |
| 11,378,081 B2* | 7/2022 | Miyasaka | ............... F04D 13/06 |
| 2016/0079822 A1* | 3/2016 | Noguchi | ............. F04D 13/0686 310/71 |
| 2016/0329772 A1 | 11/2016 | Fukunaga | |
| 2017/0310183 A1 | 10/2017 | Jang et al. | |
| 2019/0345944 A1 | 11/2019 | Miyasaka | |
| 2021/0320545 A1 | 10/2021 | Shimodaira et al. | |

FOREIGN PATENT DOCUMENTS

| | | | |
|---|---|---|---|
| EP | 3340440 A1 | 6/2018 |
| FR | 3083024 A1 | 12/2019 |
| JP | 2014-176211 A | 9/2014 |
| JP | 2019-196754 A | 11/2019 |
| JP | 2019-210924 A | 12/2019 |
| WO | 2015/060058 A1 | 4/2015 |
| WO | 2019/053002 A1 | 3/2019 |
| WO | 2020/026710 A1 | 2/2020 |

OTHER PUBLICATIONS

Notice of Reasons for Refusal dated Nov. 2, 2021 in a counterpart Japanese Patent Application No. 2020-022028.
May 4, 2021 Extended European Search Report issued in European Patent Application No. 20212997.9.
May 12, 2021 Extended European Search Report issued in European Patent Application No. 20209201.1.

* cited by examiner

Primary Examiner — Thiem D Phan
(74) Attorney, Agent, or Firm — Oliff PLC

(57) ABSTRACT

A manufacturing method of an electric pump includes engaging and welding first and second extended portions with first and second hooks, respectively, and cutting a plurality of connecting portions after the engaging and welding.

10 Claims, 11 Drawing Sheets

MANUFACTURING METHOD OF ELECTRIC PUMP

CROSS-REFERENCE TO RELATED APPLICATION

This application is based upon and claims the benefit of priority of the prior Japanese Patent Application No. 2020-022039, filed on Feb. 13, 2020, the entire contents of which are incorporated herein by reference.

BACKGROUND

(i) Technical Field

The present disclosure relates to a manufacturing method of an electric pump.

(ii) Related Art

There is known an electric pump that is equipped with a plurality of divided iron cores, a plurality of divided coil bobbins respectively attached to the plurality of the divided iron cores, a plurality of divided coils respectively wound around the plurality of divided coil bobbins, and a plurality of bus bars (see, for example, Japanese Unexamined Patent Application Publication No. 2019-196754). The plurality of the bus bars is positioned by grooves formed on a bottom wall portion of the housing.

SUMMARY

According to an aspect of the present disclosure, there is a manufacturing method of an electric pump, the electric pump including: an impeller; a rotor connected to the impeller; a housing housing the rotor; a stator surrounding an outer surface of the housing; and a bus bar unit, the bus bar unit including: a first ring portion formed into a substantial C shape; a second ring portion formed into a substantial C shape and located radially outward from the first ring portion; a plurality of connecting portions extending radially outward from the first ring portion and being connected to the second ring portion; a first hook portion extending radially outward from a radially outer periphery of the first ring portion, and curving to extend radially inward; and a second hook portion extending radially outward from a radially outer periphery of the second ring portion, and curving to extend radially inward, the stator including: a plurality of divided iron cores surrounding the outer surface of the housing; a plurality of divided coil bobbins respectively attached to the plurality of the divided iron cores; and a plurality of divided coils respectively wound around the plurality of the divided coil bobbins, the plurality of the divided coils including first and second divided coils, first and second extended portions respectively extended from the first and second divided coils, the manufacturing method including: engaging and welding the first and second extended portions with the first and second hooks, respectively, and cutting the plurality of the connecting portions after the engaging and welding.

DETAILED DESCRIPTION

Figure 1A:
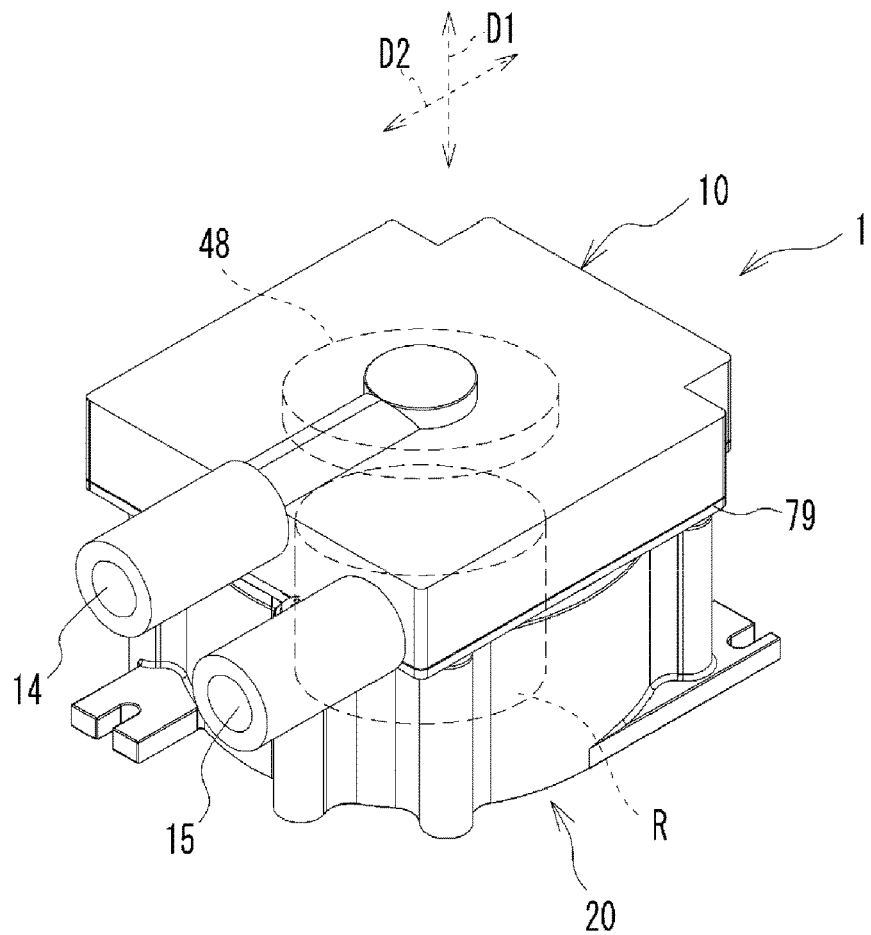
FIG. 1A is a perspective view of an electric pump.
Figure 1B:
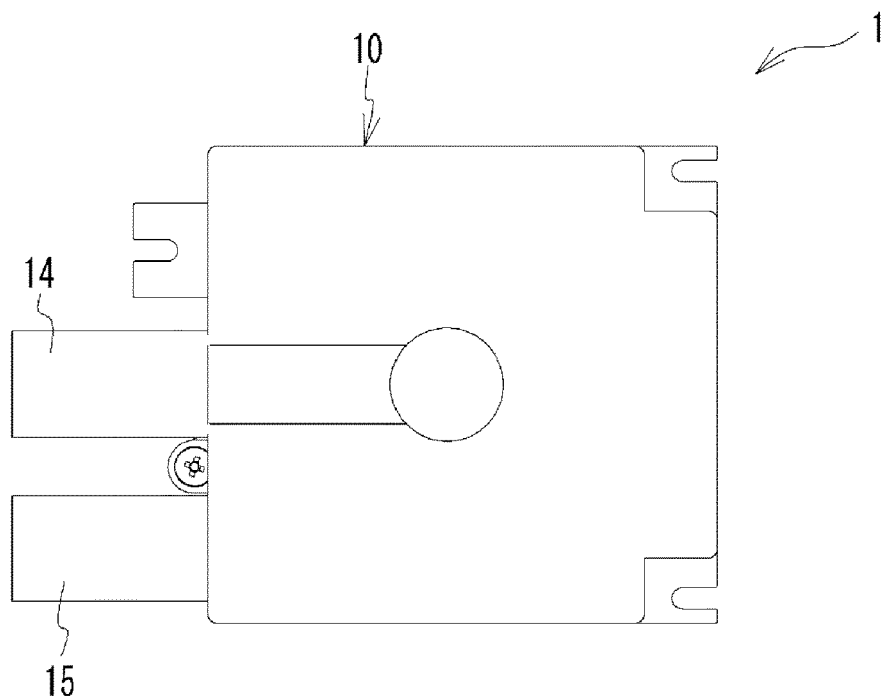
FIG. 1B is a top view of the electric pump.

FIG. 1A is a perspective view of an electric pump 1, and FIG. 1B is a top view of the electric pump 1. The electric pump 1 includes cases 10 and 20. The case 10 defines an internal space for housing an impeller 48. The internal space is connected to an introduction pipe portion 14 for introducing a fluid, which is a liquid, and to a discharge pipe portion 15 for discharging the fluid. The introduction pipe portion 14 and the discharge pipe portion 15 are substantially parallel to each other, and extend in a direction orthogonal to an axial direction D1 parallel to a rotational center axis of the impeller 48. A printed circuit board, described below, is provided within the case 10. The case 20 houses a motor M. FIG. 1 illustrates an orthogonal direction D2, which is orthogonal to the axial direction D1.

Figure 2:
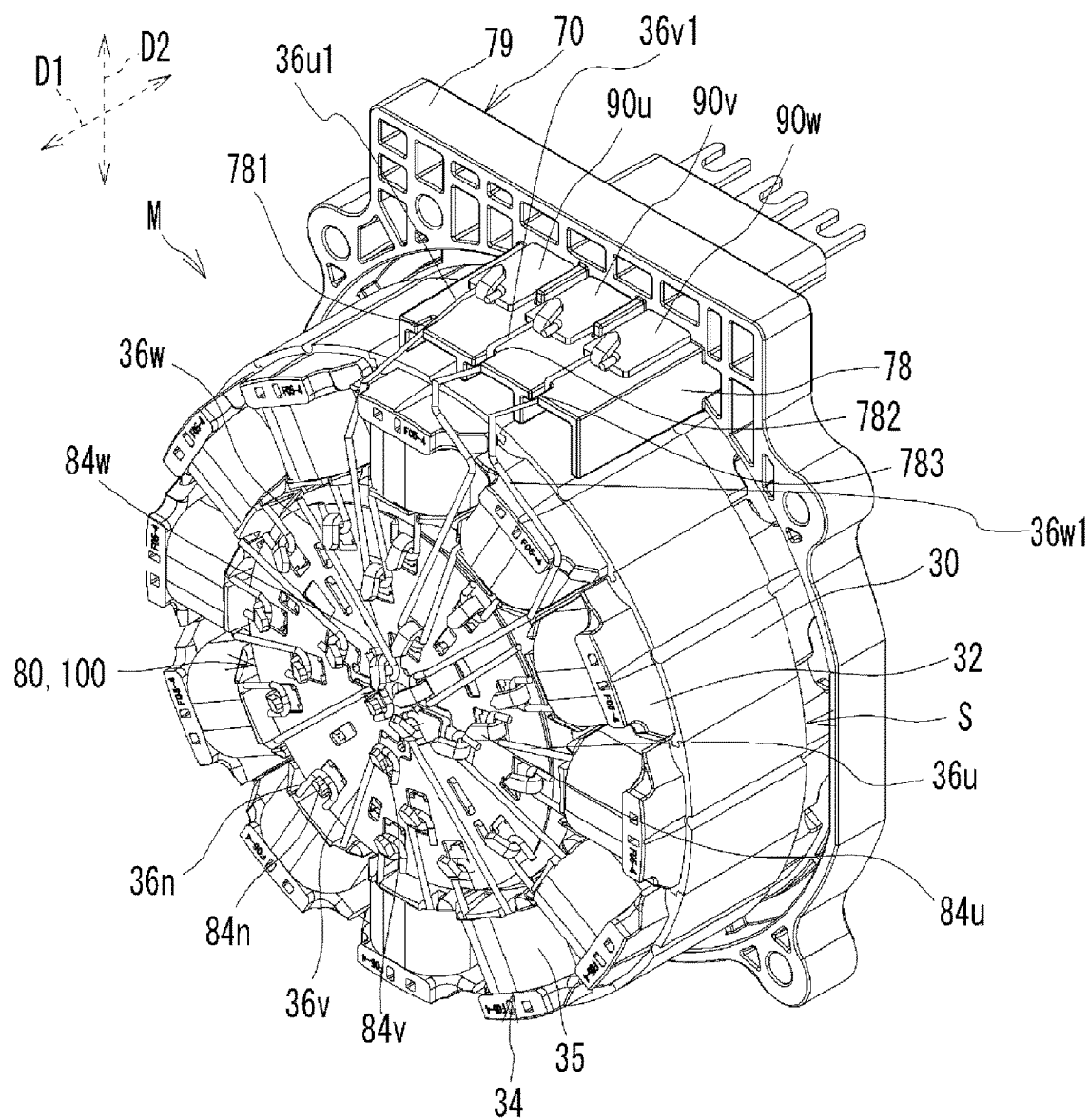
FIG. 2 is an explanatory view of a motor housed in a case.
Figure 3:
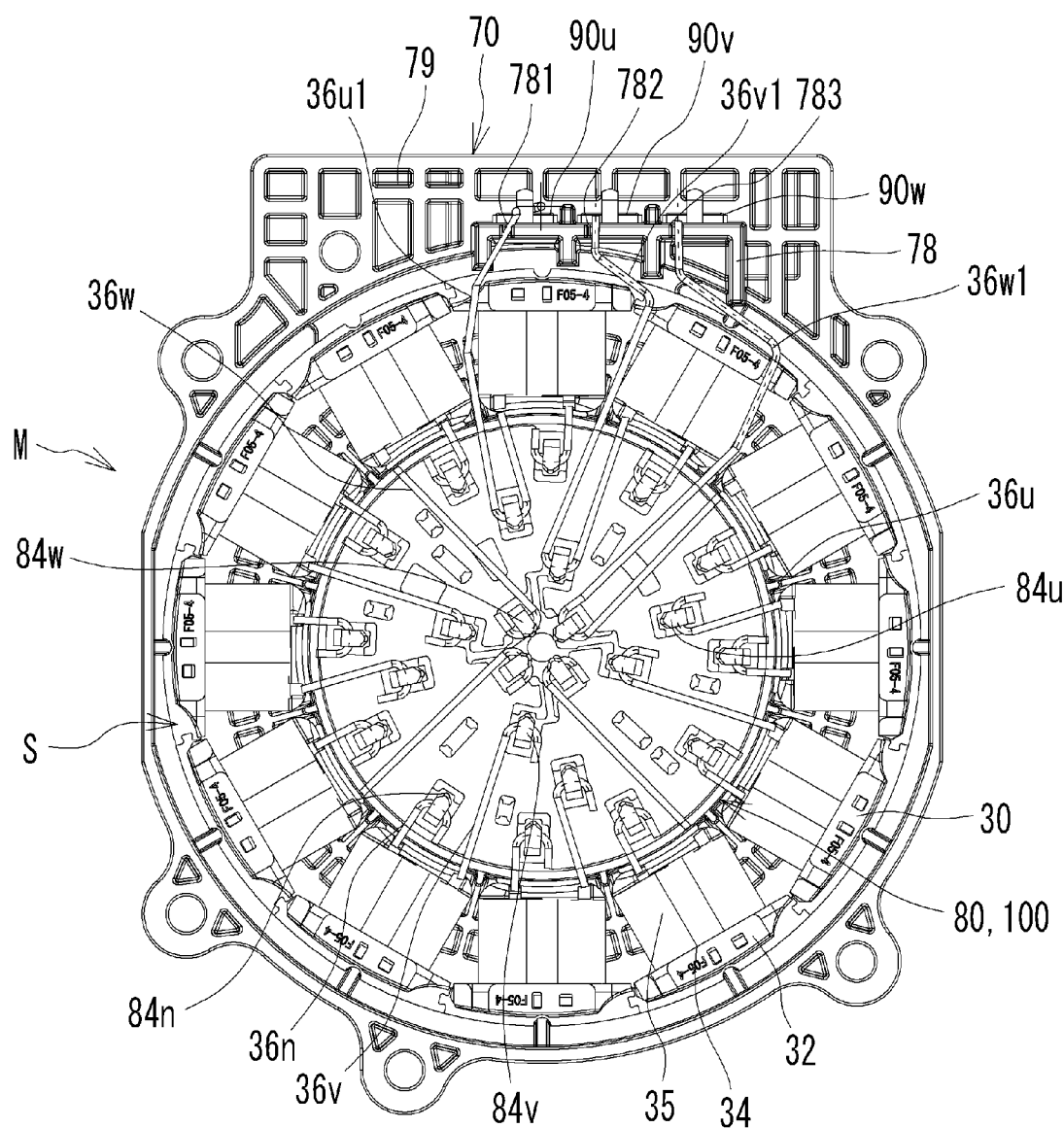
FIG. 3 is an explanatory view of the motor housed in the case.
Figure 4:
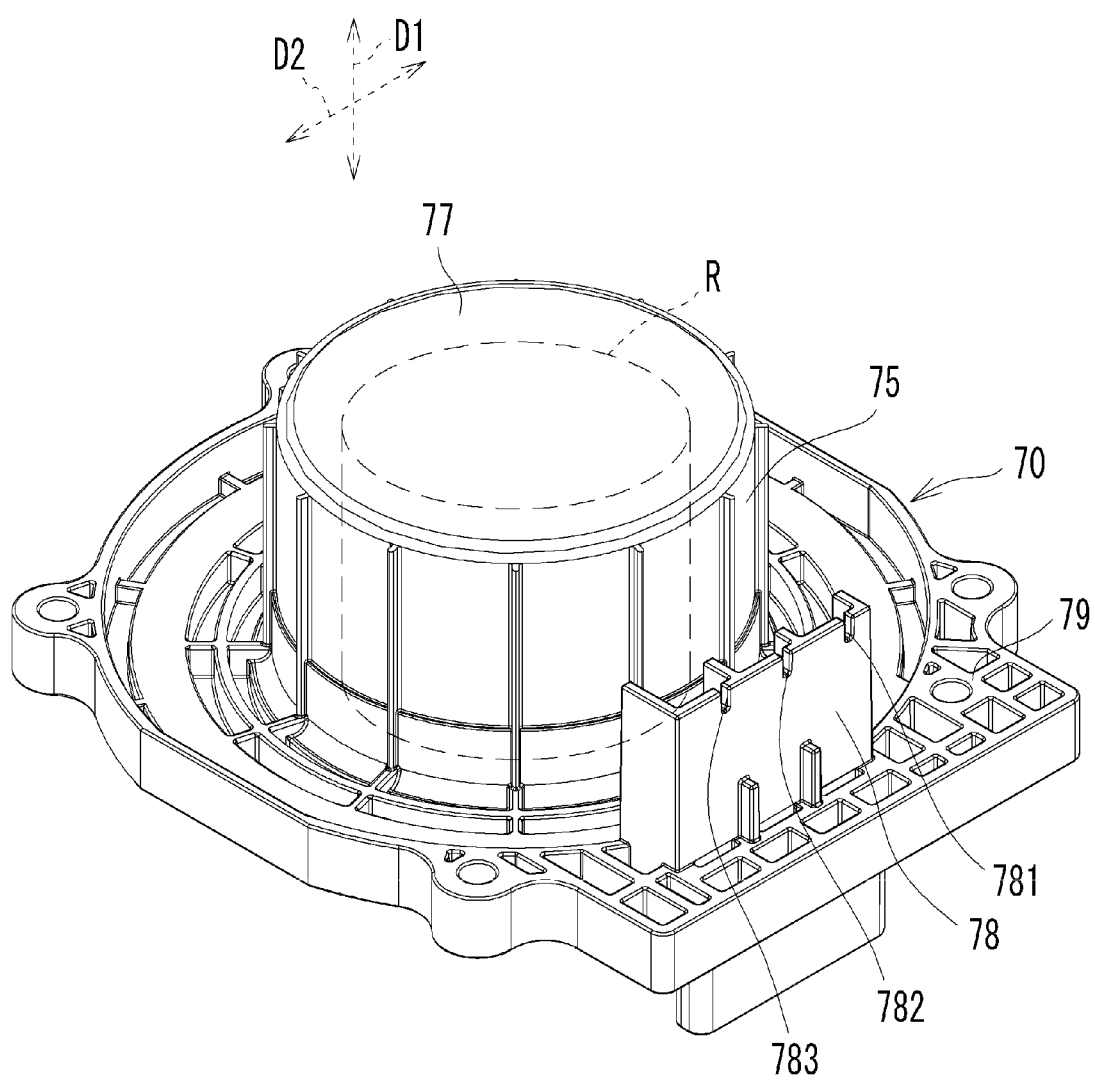
FIG. 4 is an external view of a housing of the motor.

FIGS. 2 and 3 are illustrative views of the motor M housed in the case 20. FIG. 4 is an external view of a housing 70 of the motor M. The motor M includes: a rotor R; the housing 70 housing the rotor R; a stator S disposed around the housing 70; and a bus bar unit 80. The stator S includes: a plurality of divided iron cores 30; a plurality of divided coil bobbins 32 respectively attached to the plurality of the divided iron cores 30; and a plurality of divided coils 34 respectively wound around the plurality of the divided coil bobbins 32. Twelve pairs of the divided iron core 30, the divided coil bobbin 32, and the divided coil 34 are provided, as will be described later in detail. The rotor R is provided with a plurality of permanent magnets facing an inner surface of a cylindrical portion 75 of the housing 70. The impeller 48 is connected to the permanent magnets, and the rotor R and the impeller 48 rotate together. When the impeller 48 rotates, fluid is introduced into the case 10 from the introduction pipe portion 14 and is discharged from the discharge pipe portion 15.

As illustrated in FIG. 4, the housing 70 includes the cylindrical portion 75, a bottom wall portion 77, a support plate 78, and a flange portion 79. The rotor R is housed within and surrounded by the cylindrical portion 75. Specifically, the rotor R is supported on the bottom wall portion 77 in a posture in which a rotational shaft of the rotor R is orthogonal thereto. The rotor R is rotatably supported by providing a sliding bearing between the rotational shaft and the rotor R. An inner peripheral surface of the cylindrical portion 75 faces the plurality of the permanent magnets fixed to an outer peripheral surface of the rotor R. The flange portion 79 extends radially outward from an end of the cylindrical portion 75 opposite to the bottom wall portion 77. The support plate 78 protrudes from the flange portion 79 in the axial direction D1. The protrusion height of the support plate 78 in the axial direction D1 from the flange portion 79 is set not to exceed the bottom wall portion 77. The support plate 78 is located not to contact with a stator S, as illustrated in FIG. 2. Guide grooves 781 to 783 are formed at an end of the support plate 78 opposite to the flange portion 79. As illustrated in FIGS. 2 and 3, the plurality of the divided iron cores 30 are circumferentially arranged to surround the outer surface of the cylindrical portion 75 of the housing 70. The housing 70 is made of, but not limited to, synthetic resin, and may be made of, for example, non-magnetic metal.

As illustrated in FIGS. 2, 3, and 4, the bus bar unit 80 and a sheet of insulating paper 100 are disposed on an outer surface of the bottom wall portion 77 of the housing 70. The bus bar unit 80 is conductively connected to the plurality of the divided coils 34 via extended portions 36 extended from the divided coils 34, as will be described later. Also, the bus bar unit 80 is conductively connected to terminal pins 90u, 90v, and 90w via the extended portions 36. The terminal pins 90u, 90v, and 90w are conductively connected to the printed circuit board for controlling a drive state of the motor M. The terminal pins 90u, 90v, and 90w are supported by the support plate 78 and are respectively inserted into insertion holes formed in the flange portion 79. The support plate 78 is an example of a support portion.

Figure 5A:
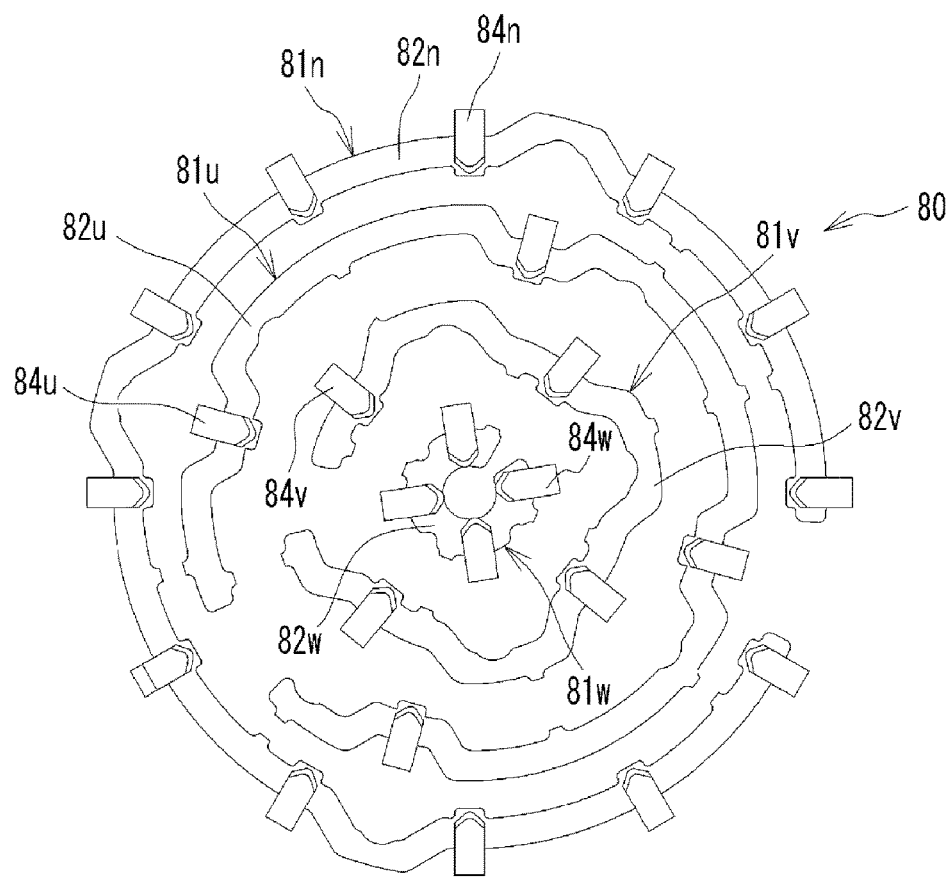
FIGS. 5A and 5B are explanatory views of a bus bar unit.
Figure 5B:
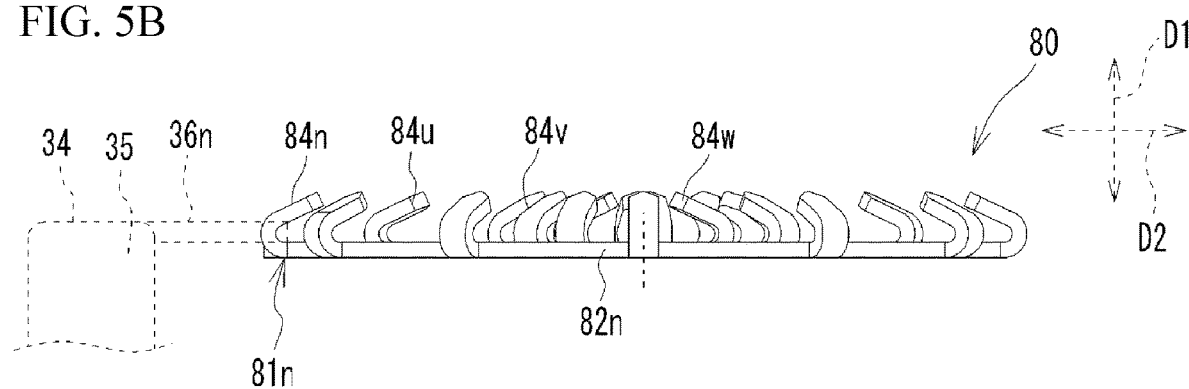

FIGS. 5A and 5B are explanatory views of the bus bar unit 80. FIG. 5A illustrates a front view of the bus bar unit 80. FIG. 5B illustrates a side view of the bus bar unit 80. The bas bar unit 80 includes bas bars 81n, 81u, 81v, and 81w each formed into a substantially C-shape. The bas bars 81n, 81u, 81v, and 81w are substantially and concentrically arranged on the same plane. The bus bars 81n, 81u, 81v, and 81w are made of a flat metal plate material made of copper or the like, and are punched and bent by pressing or the like. The bus bar 81n, which is a common bar, is disposed at the radially outermost position. The bus bar 81w is disposed at the radially innermost position. The bus bar 81u is disposed radially outward from the bus bar 81v. Therefore, diameter becomes smaller in an order of the bus bars 81n, 81u, 81v and 81w. The bus bars 81u, 81v, and 81w are provided for a U phase, a V phase, and a W phase, respectively.

The bus bar 81n includes a ring portion 82n and a plurality of hook portions 84n provided in the ring portion 82n. Likewise, the bus bar 81u includes a ring portion 82u and a plurality of hook portions 84u, the bus bar 81v includes a ring portion 82v and a plurality of hook portions 84v, and the bus bar 81w includes a ring portion 82w and a plurality of hook portions 84w. The ring portions 82n, 82u, 82v, and 82w have smaller circumferential lengths in this order. Each of the ring portions 82n, 82u, 82v, and 82w is formed into the substantial C-shape with both ends, and is formed such that its thickness in the axial direction D1 is smaller than its width in the radial direction. The substantial C-shape is not limited to a C-shape including a complete arc as illustrated in FIG. 5A, and may include a plurality of substantially linear portions with both ends facing each other, or may include a substantially linear portion and a substantially curved portion with both ends facing each other.

The hook portions 84n, 84u, 84v, and 84w extend radially outward from the outer radial periphery of the ring portions 82n, 82u, 82v, and 82w, and are curved radially inward, respectively. The hook portions 84n are provided at approximately equal angular intervals. The number of the hook portions 84n is equal to the number of the divided coils 34. Specifically, the twelve hook portions 84n are provided. The four hook portions 84u, the four hook portions 84v, and the four hook portions 84w are provided. FIG. 5B illustrates the divided coil 34, as will be described later in detail.

Figure 6A:
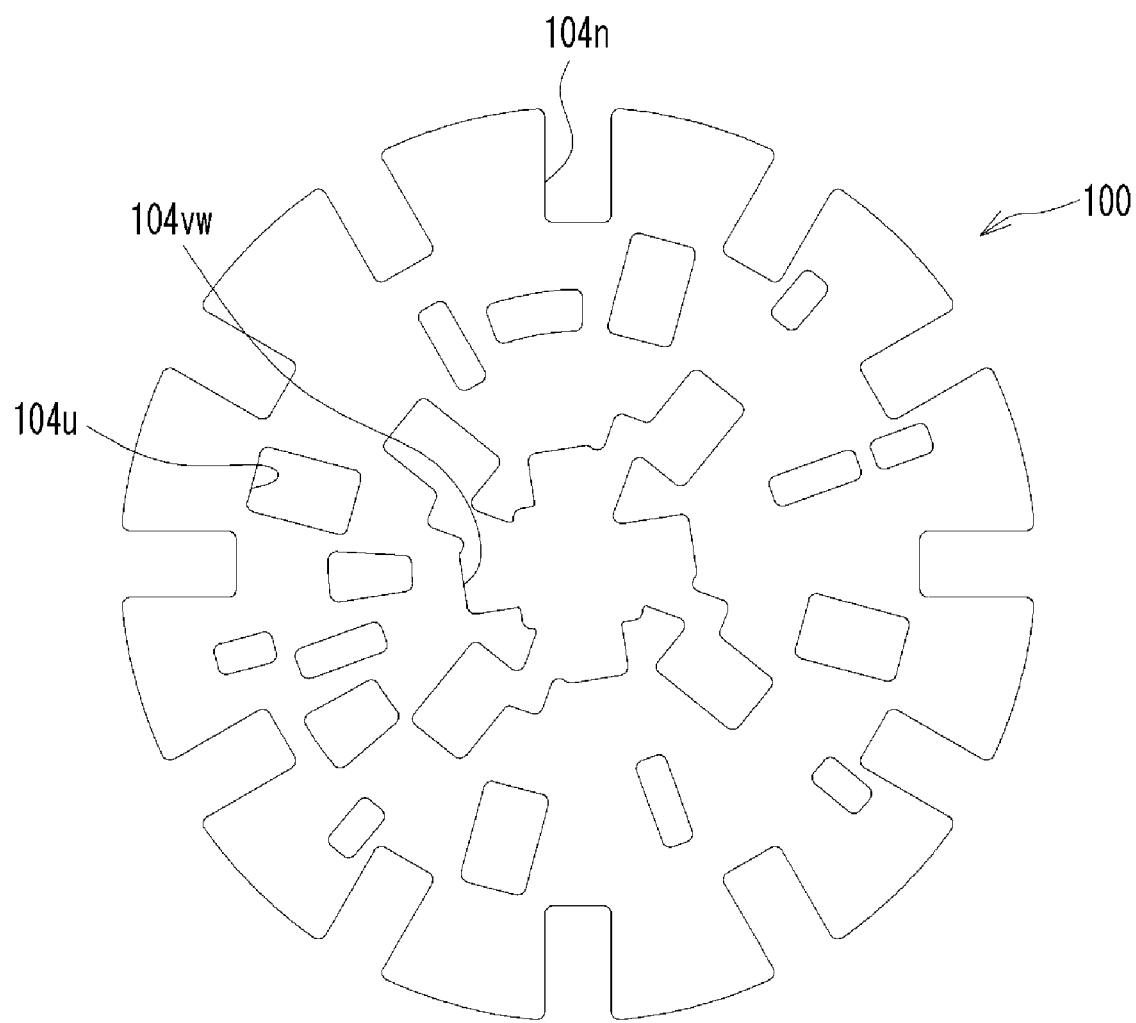
FIGS. 6A and 6B are explanatory views of a sheet of insulating paper.
Figure 6B:

FIGS. 6A and 6B are explanatory views of the insulating paper 100. FIG. 6A illustrates a front view of the insulating paper 100. FIG. 6B illustrates a side view of the insulating paper 100. The insulating paper 100 is formed into a substantially round shape and is formed with notches 104n on the outer circumferential edge so as to respectively expose the hook portions 84n. Openings 104u are formed in the insulating paper 100 so as to respectively expose the hook portions 84u. An opening 104vw is formed in the center of the insulating paper 100 so as to expose the four hook portions 84v and the four hook portions 84w. The insulating paper 100 covers the ring portions 82n, 82u, and 82v, but exposes the hook portions 84n, 84u, 84v, and 84w. Further, the insulating paper 100 is formed with other openings for other application.

As illustrated in FIGS. 2 and 3, the divided coil 34 for the U phase includes: a wound portion 35 wound around the divided coil bobbin 32; and extended portions 36u and 36n extended from the wound portion 35. The extended portion 36n is one end of the divided coil 34, and the extended portion 36u is the other end of the divided coil 34. Similarly, the divided coil 34 for the V phase includes the wound portion 35, and extended portions 36v and 36n. The divided coil 34 for the W phase includes the wound portion 35, and extended portions 36w and 36n. The extended portions 36n of the divided coils 34 for each phase are respectively welded with the hook portions 84n. The extended portions 36u, 36v, and 36w are engaged and welded with the hook portions 84u, 84v, and 84w, respectively. They are engaged and welded in this way, whereby conduction failure between the divided coils and the bus bars is suppressed.

The plurality of the hook portions 84n of the bus bars 81n are welded with the plurality of the extended portions 36n. The plurality of the hook portions 84n are arranged at approximately equal angle intervals. The same is true for the bus bars 81u, 81v, and 81w. Therefore, positional displacement of the bus bars 81n, 81u, 81v, and 81w is suppressed, even in a case where the bottom wall portion 77 of the housing 70 is not provided with positioning portions for restricting the respective positions of the bus bars 81n, 81u, 81v, and 81w. This suppresses, for example, a short circuit caused by positionally displacing the bus bars to contact with each other.

As seen from FIGS. 5B and 2, the bus bars 81n, 81u, 81v, and 81w of the bus bar unit 80 and the insulating paper 100 overlap the plurality of the divided coils 34 in the orthogonal direction D2. As a result, an increase in size of the motor M in the axial direction D1 is suppressed. This also suppresses an increase in size of the electric pump 1 in the axial direction D1. This also facilitates workability of engagement of the extended portion 36n of the divided coil 34 with the hook portion 84n.

As seen from FIGS. 3 and 5A, the extended portions 36u overlap the ring portion 82n of the bus bar 81n in the axial direction D1 through the insulating paper 100. This suppresses a short circuit caused by the contact of the extended portion 36u with the ring portion 82n. Likewise, the extended portions 36v overlap the ring portions 82n and 82u of the bus bars 81n and 81u through the insulating paper 100 in the axial direction D1, thus suppressing a short circuit caused by the contact of the extended portion 36v with any of the ring portions 82n and 82u. The extended portions 36w overlap the ring portions 82n, 82u, and 82v of the bus bars 81n, 81u, and 81v in the axial direction D1 through the insulating paper 100, thus suppressing a short circuit caused by the contact of the extended portion 36w with any of the ring portions 82n, 82u, and 82v. Further, since the bus bar unit 80 is covered with the insulating paper 100, the extended portions 36u, 36v, and 36w are arranged as close as possible to the bus bar unit 80 therealong, while suppressing the short circuit described above. Therefore, the size of the electric pump 1 in the axial direction D1 is reduced.

As illustrated in FIGS. 2 and 3, one extended portion 36u1 of the divided coil 34 for the U phase is engaged and welded with the hook portion 84u. An end of the extended portion 36u1 extended outside the stator S is inserted into and guided by the guide groove 781 of the support plate 78 to be conductively connected to the terminal pin 90u. Similarly, an end of one extended portion 36v1 of the divided coil 34 for the V phase is inserted into and guided by the guide groove 782 of the support plate 78 to be conductively connected to the terminal pin 90v. An end of one extended portion 36w1 of the divided coil 34 for the W phase is inserted into and guided by the guide groove 783 of the support plate 78 to be conductively connected to the terminal pin 90w. The guide grooves 781 to 783 are examples of guide portions and are not limited thereto. The guide portion may be a guide opening, for example, formed in the support plate 78 and capable of being inserted with the extended portion of the divided coil.

This makes the terminal pin 90u small, for example, as compared with a case where a terminal pin is extended from the outside of the stator S to the hook portion 84u through the stator S to be conductively connected to the hook portion 84u. The same is true for the terminal pins 90v and 90w. For this reason, a manufacturing cost is reduced.

Figure 7A:
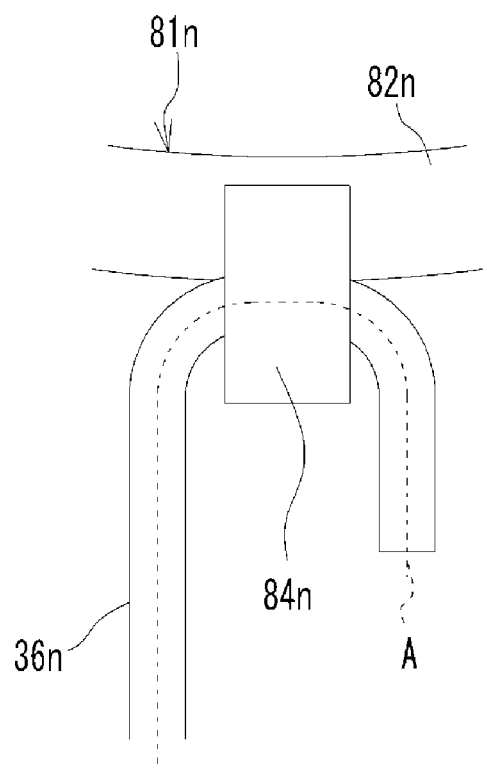
FIGS. 7A and 7B are enlarged views around a hook portion of a bus bar before temporary caulking and welding.
Figure 7B:
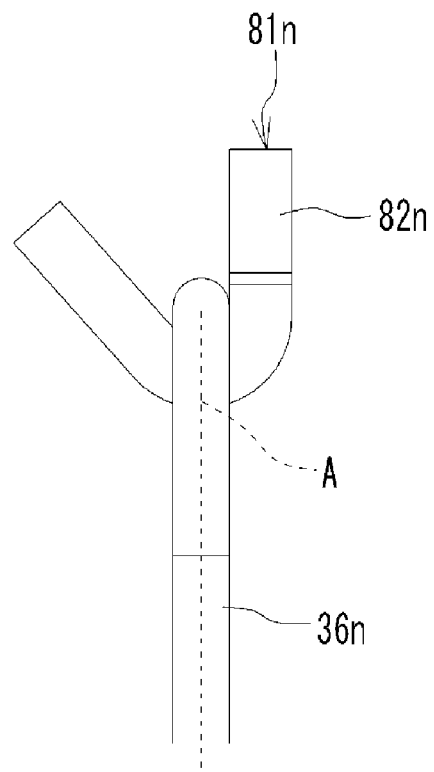
Figure 8A:
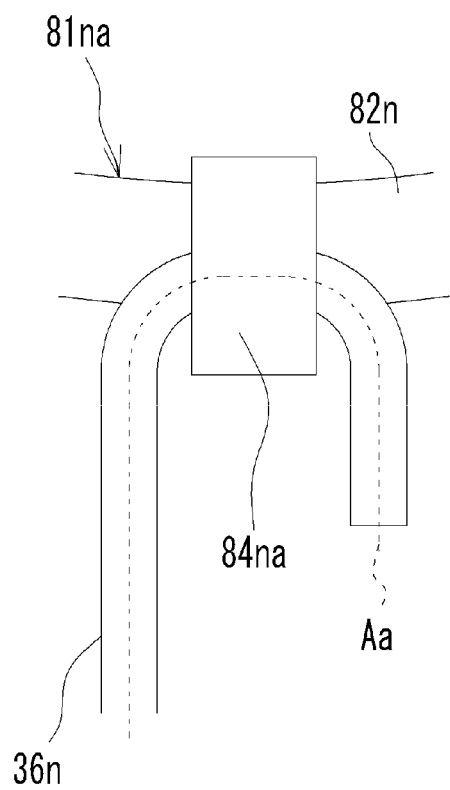
FIGS. 8A and 8B are enlarged views around the hook portion of a bus bar according to a variation before temporary caulking and welding.
Figure 8B:
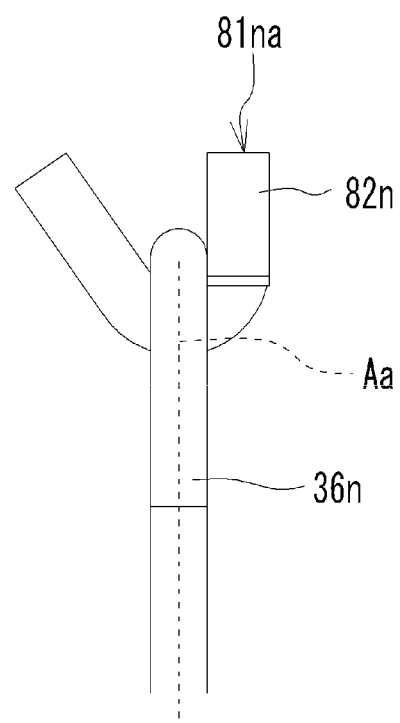

FIGS. 7A and 7B are enlarged views of the hook portion 84n around the hook portion 84n of the bus bar 81n before temporary caulking and welding. When temporary caulking is performed, the hook portion 84n is bent toward the bus bar 81n in the axial direction D1, and is deformed to surround the extended portion 36n. This fixes the hook portion 84n and the extended portion 36n. One example of welding is resistance welding, but is not limited thereto. In FIGS. 7A and 7B, a central axis A of the extended portion 36n is illustrated in a dotted line. The central axis A at the point where the extended portion 36n engages the hook portion 84n does not overlap the ring portion 82n in viewed in the axial direction D1. FIGS. 8A and 8B are enlarged views around a hook portion 84na of a bus bar 81na according to variation before temporary caulking and welding. The temporary caulking and welding is the same as that illustrated in FIGS. 7A and 7B. In FIGS. 8A and 8B, a central axis Aa of the extended portion 36n is illustrated in a dotted line. In the bus bar 81na according to the variation, the central axis Aa at the point where the extended portion 36n engages the hook portion 84na overlaps the ring portion 82n when viewed in the axial direction D1. When the central axis Aa overlaps the ring portion 82n in the variation, the extended portion 36n might rise away from the ring portion 82n in the axial direction D1 around the point where the extended portion 36n engages the hook portion 84na. This might increase the size of the electric pump in the axial direction D1. In addition, the extended portion 36n is engaged with the hook portion 84na, and then is welded therewith by resistance welding. At this time, an electrode of resistance welding might contact with a rising portion of the extended portion 36n around the hook portion 84na before the electrode contacts with the hook portion 84na, and then electric current might flow from the extended portion 36n to the divided coil 34, so that welding might not be performed properly. In the present embodiment, the central axis A at the point of engagement of the extended portion 36n with the hook portion 84n does not overlap the ring portion 82n in viewed in the axial direction D1, thereby suppressing the rising of the extended portion 36n, and achieving suitable welding. For this reason, as illustrated in FIGS. 7A and 7B, preferably, the central axis A at the point of engagement of the extended portion 36n with the hook portion 84n does not overlap the ring portion 82n in viewed in the axial direction D1.

Figure 9:
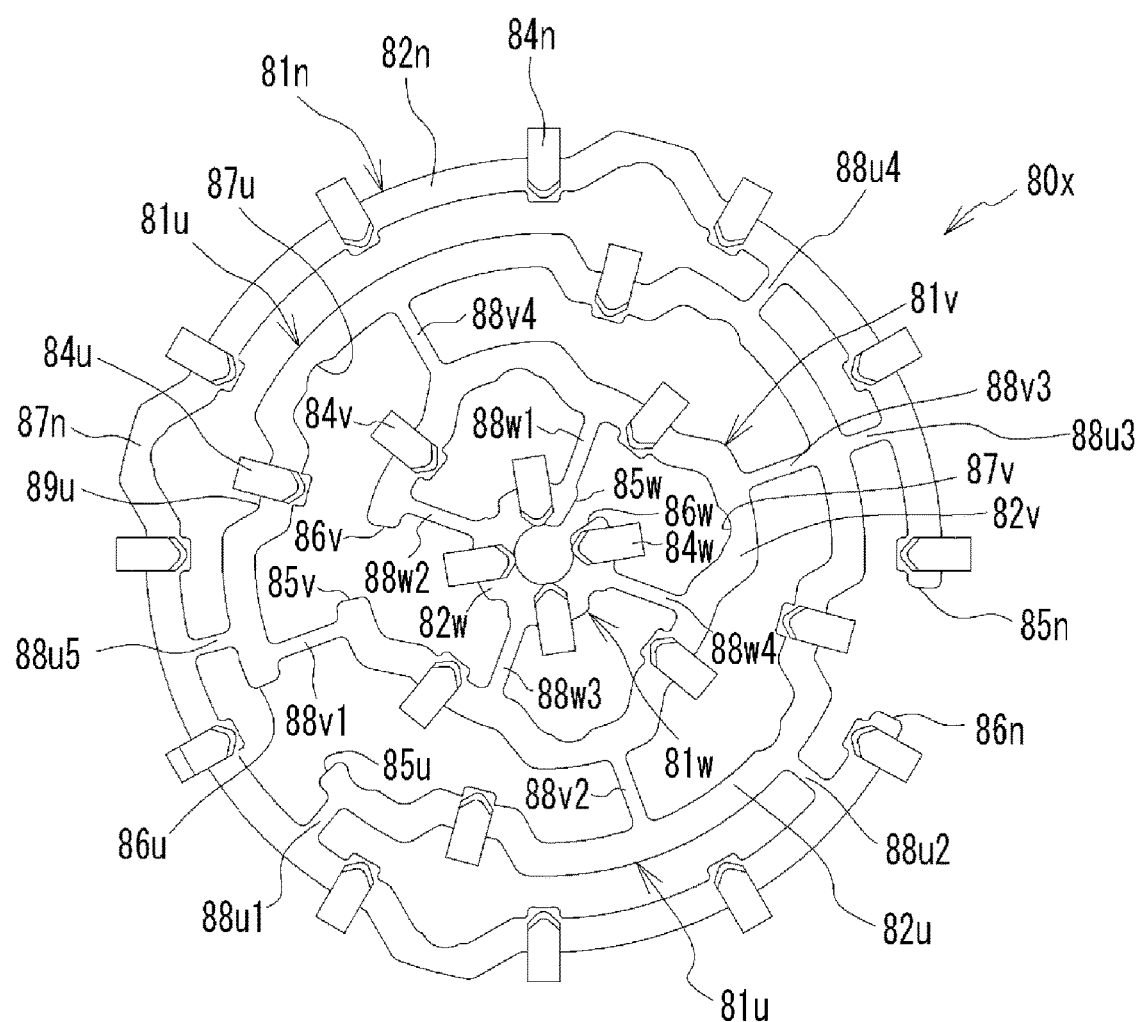
FIG. 9 is an explanatory view of a bus bar unit immediately after being manufactured by pressing.

Next, a description will be given of a manufacturing method of the electric pump 1, in particular, the motor M. First, a bus bar unit 80x is manufactured by pressing. FIG. 9 is an explanatory view of the bus bar unit 80x immediately after the bus bar unit 80x is manufactured by pressing. The ring portions 82u and 82n are connected through five connecting portions 88u1 to 88u5 that extend radially outward from the ring portion 82u and are provided at substantially equal angle intervals in the circumferential direction. Similarly, the ring portions 82v and 82u are connected through four connecting portions 88v1 to 88v4 that extend radially outward from the ring portions 82v and are provided at substantially equal angle intervals in the circumferential direction. The ring portions 82w and 82v are connected through four connecting portions 88w1 to 88w4 that extend radially outward from the ring portion 82w and are provided at substantially equal angle intervals in the circumferential direction. That is, the bus bars 81n, 81u, 81v, and 81w are manufactured in one piece by pressing. For this reason, an increase in manufacturing cost is suppressed, as compared to a case where the bus bars 81n, 81u, 81v, and 81w are manufactured separately. The number of connecting portions is not limited to the above described number.

The ring portion 82n includes one end 85n and the other end 86n. Similarly, the ring portion 82u includes one end 85u and the other end 86u. The ring portion 82v includes one end 85v and the other end 86v. The ring portion 82w includes one end 85w and the other end 86w.

The connecting portion 88u1 is formed close to one end 85u, as compared to the hook portion 84u closest to one end 85u. The connecting portion 88u5 is formed close to the other end 86u, as compared to the hook portion 84u closest to the other end 86u. Each of the connecting portions 88u1 to 88u5 is formed between two adjacent hook portions 84n formed in the ring portion 82n. Each of the connecting portions 88u2 to 88u4 is formed between two adjacent hook portions 84u formed in the ring portion 82u.

The connecting portion 88v1 is close to one end 85v, as compared to the hook portion 84v closest to one end 85v. Each of the connecting portions 88v2 to 88v4 is formed between two adjacent hook portions 84u formed in the ring portion 82u, and between two adjacent hook portions 84v formed in the ring portion 82v.

The connecting portion 88w1 is close to one end 85w, as compared to the hook portion 84w closest to one end 85w. The connecting portion 88w2 is close to the other end 86v, as compared to the hook portion 84v closest to the other end 86v of the ring portion 82v. Each of the connecting portions 88w1, 88w3, and 88w4 is formed between two adjacent hook portions 84v. Each of the connecting portions 88w2 to 88w4 is formed between two adjacent hook portions 84w.

The ring portion 82v includes a retracted portion 87v that faces the hook portion 84w and is retracted radially outward therefrom. The ring portion 82u includes a retracted portion 87u that faces the hook portion 84v and is retracted radially outward therefrom. The ring portion 82n includes a retracted portion 87n that faces the hook portion 84u and is retracted radially outward therefrom. The retracted portion 87v is spaced away from the connecting portions 88w1 to 88w4 in the circumferential direction of the ring portion 82v. The retracted portion 87u is spaced away from the connecting portions 88v1 to 88v4 in the circumferential direction of the ring portion 82u. The retracted portion 87n is spaced away from the connecting portions 88u1 to 88u4 in the circumferential direction of the ring portion 82n. The ring portion 82u includes a retracted portion 89u. The retracted portion 89u is provided with the hook portion 84u, faces the retracted portion 87n, and is retracted radially inward therefrom. The retracted portions 87n, 87u, and 87v will be described later.

Figure 10:
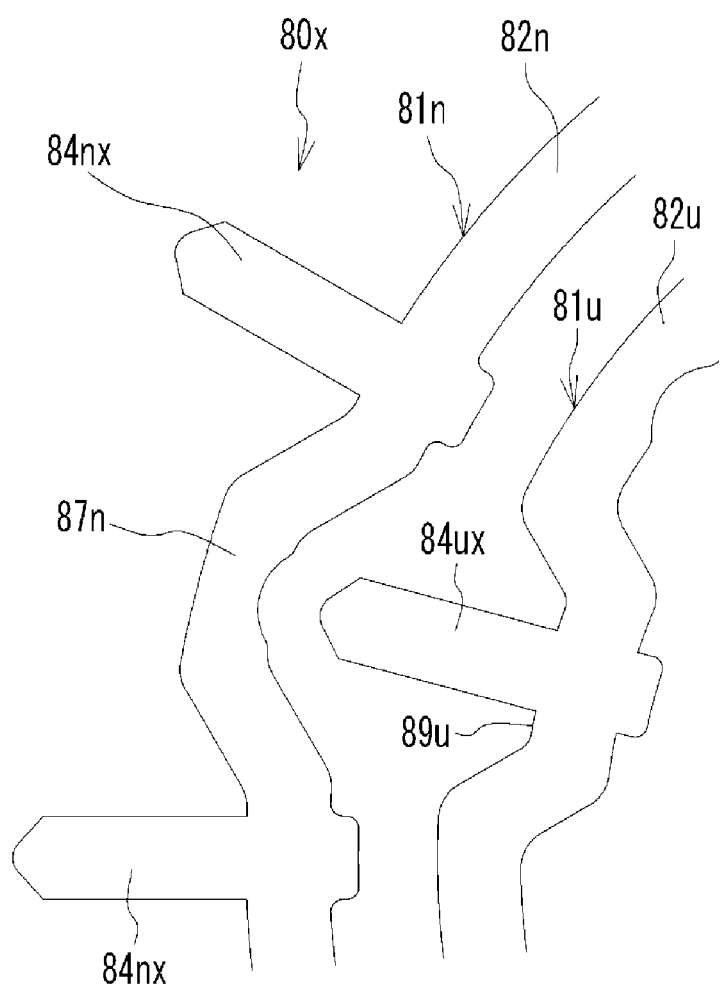
FIG. 10 illustrates the bus bar unit in being manufactured by pressing.

FIG. 10 illustrates the bus bar unit 80x in being manufactured by pressing. As for the bus bar unit 80x, firstly, a thin metal plate is punched out. Next, flat protruding portions 84nx and 84ux protruding radially from the ring portions 82n and 82u are bent to form the hook portions 84n and 84u, respectively. Specifically, the punching process, and the bending process to form the hook portions 84n and the like are performed by the same die equipment. Herein, as illustrated in FIG. 9, the retracted portion 87n is formed to be retracted from the protruding portion 84ux. This ensures a length of the protruding portion 84ux, even if a radial gap between the ring portions 82u and 82n is small. The same role is performed for the other retracted portions 87u, 87v, and 87w. This ensures each length of the hook portions 84n, 84u, 84v, and 84w. Further, as illustrated in FIGS. 7A and 7B, it is possible to position the central axis of the extended portion radially outward from the ring portion provided with the hook portions with which the extended portions are engaged, thereby improving the workability of the welding. In addition, since the retracted portion 89u is retracted radially inward from the retracted portion 87n, this also ensures the length of the protruding portion 84ux. The retracted portions 87n, 87u, and 87v are examples of second retracted portions. The retracted portion 89u is an example of a first retracted portion.

Figure 11:
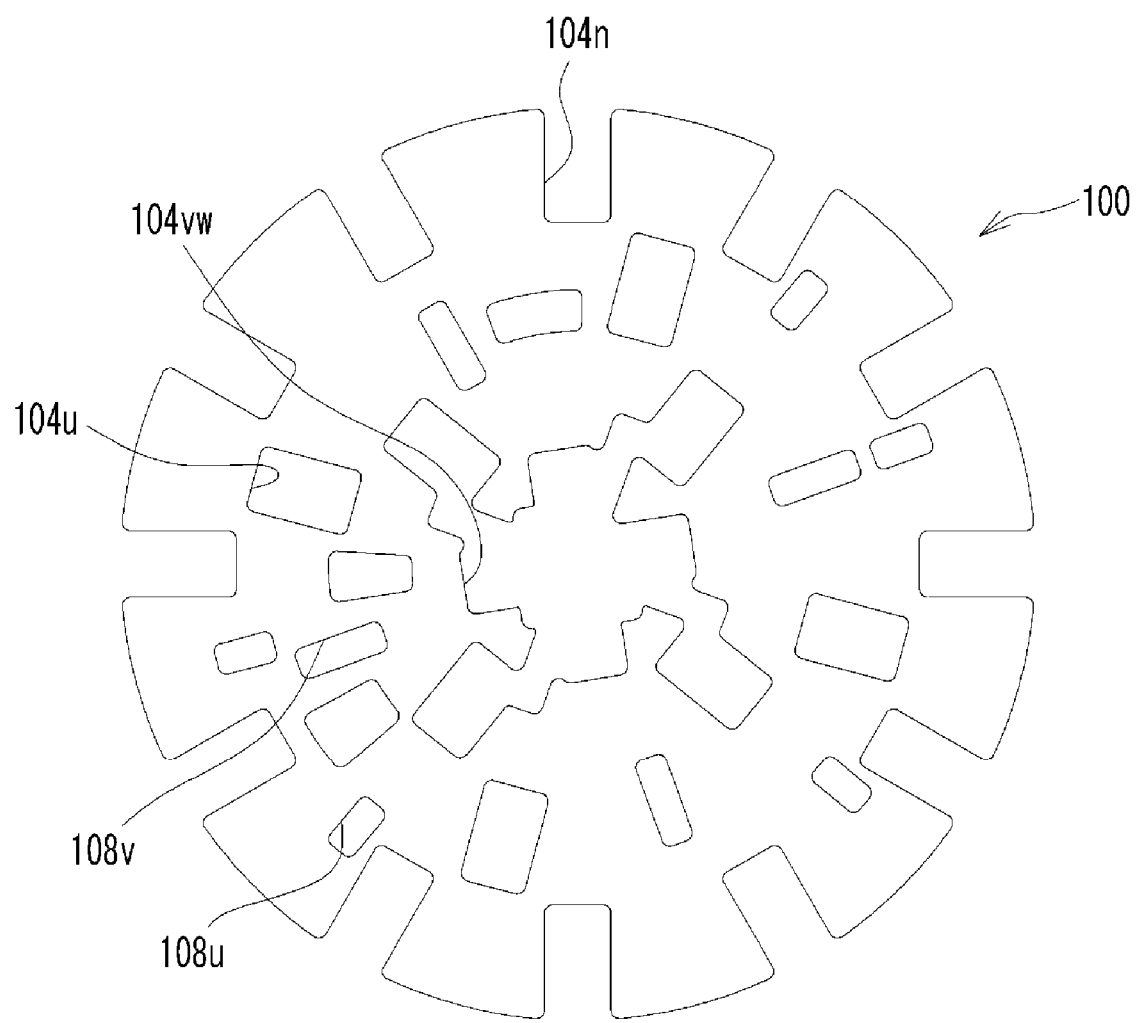
FIG. 11 is an explanatory view of the sheet of the insulating paper.

The bus bar unit 80x manufactured in such a way and the terminal pins 90u, 90v, and 90w are placed on a jig not illustrated. Next, the insulating paper 100 is placed on the bus bar unit 80x. Herein, the insulating paper 100 is illustrated again in FIG. 11. FIG. 11 is an explanatory view of the insulating paper 100. The insulating paper 100 includes four openings 108v formed at a predetermined distance from the center and at a substantially equal angle interval. Further, five openings 108u are formed radially outward from the openings 108v at a substantially equal angle interval. The openings 108v are formed at positions corresponding to the connecting portions 88v1 to 88v4, respectively. The openings 108u are formed at positions corresponding to the connecting portions 88u1 to 88u5, respectively. The insulating paper 100 is placed on the bus bar unit 80x as follows. The notches 104n positionally correspond to the hook portions 84n, respectively. The openings 104u correspond to the hook portions 84u, respectively. The openings 104vw positionally correspond to the hook portions 84v and 84w. Further, the opening 108u positionally corresponds to each of the connecting portions 88u1 to 88u5. The opening 108v positionally corresponds to each of the connecting portions 88v1 to 88v4. The opening 108v positionally corresponds to each of the connecting portions 88w1 to 88w4 The opening 104vw positionally corresponds to each of the connecting portions 88w1 to 88w4. Thus, the connecting portions 88u1 to 88u5, 88v1 to 88v4, and 88w1 to 88w4 are exposed from the insulating paper 100.

Next, the connection process is performed. Specifically, the extended portions 36n, 36u, 36v, and 36w of the divided coils 34 are engaged with the hook portions 84n, 84u, 84v, and 84w, respectively, and secured therewith by temporary caulking. Next, the extended portions 36u1, 36v1, and 36w1 of the divided coils 34 are engaged with the terminal pins 90u, 90v, and 90w, respectively, and are secured therewith by temporary caulking. As for the order of the temporary caulking, firstly, the terminal pins may be done, and then the hook portions may be done, or the terminal pins and the hook portions may be done at the same time. Next, the hook portion 84n and the extended portion 36n, the hook portion 84u and the extended portion 36u, the hook portion 84v and the extended portion 36v, and the hook portion 84w and the extended portion 36w are welded by resistance welding. Next, the terminal pin 90u and the extended portion 36u1, the terminal pin 90v and the extended portion 36v1, the terminal pin 90w and the extended portion 36w1 are welded by resistance welding. As for the order of welding, firstly, the terminal pins may be done, and then the hook portions may be done, or the terminal pins and the hook portions may be done at the same time. Thereby, the bus bar unit 80x and the terminal pins 90u, 90v, and 90w are conductively connected to the plurality of divided coils 34. Next, each extra-length of the extended portions 36n, 36u, 36v, 36w, 36u1, 36v1, and 36w1 is cut using a jig such as an air nipper.

Next, the cutting process of the connecting portion 88 is performed. Specifically, the connecting portions 88u1 to 88u5, 88v1 to 88v4, and 88w1 to 88w4 exposed from the openings 108u, 108v, and 104vw are cut using a jig such as an air nipper. Thus, the bus bars 81n, 81u, 81v, and 81w are separated from one another, which manufactures the bus bar unit 80. Additionally, after cutting the connecting portions 88u1 to 88u5, 88v1 to 88v4, and 88w1 to 88w4, each extra-length of the extended portions 36n, 36u, 36v, and 36w may be cut.

Next, the bus bar unit 80 and the insulating paper 100 are placed on the bottom wall portion 77 of the housing 70, and the stator S is placed around the cylindrical portion 75. Next, the terminal pins 90u, 90v, and 90w are placed on the flange portion 79. Next, the extended portions 36u1, 36v1, and 36w1 are engaged with the guide grooves 781, 782, and 783 of the support plate 78, respectively. The bus bar unit 80, the insulating paper 100, the insulating paper 100, the stator S, and the housing 70, the terminal pins 90u, 90v, and 90w are installed within a mold not illustrated, and the case 20 is formed by injecting resin into the mold. A plurality of openings are formed in the insulating paper 100 to allow such a flow of the resin. Next, the rotor R is placed in the housing 70. In the motor M manufactured in this manner, the bus bar unit 80, the stator S, the terminal pins 90u, 90v, and 90w are resin-sealed to improve water and dust resistance. Additionally, the bus bar unit 80, the insulating paper 100, and the stator S, whose divided coils 34 are conductively connected to the bus bar unit 80 and the terminal pins 90u, 90v, and 90w may be placed in the mold, and the resin may be injected into the mold, which may manufacture the housing 70 and the case 20.

As described above, in performing the connection process described above, the bus bars 81n, 81u, 81v, and 81w are integrally formed with the connecting portions. Therefore, during the engagement and welding process, positional displacement and deflection between the bus bars 81n, 81u, 81v, and 81w is suppressed. Further, the connecting portions described above are provided between the hook portions or at ends of the ring portions. For this reason, the positional displacement and deflection between the bus bars 81n, 81u, 81v, and 81w is suppressed, even if large force acts on the hook portions in the connection process described above.

Thus, the workability is improved because the connection process is performed without considering the positional displacement and deflection between the bus bars 81n, 81u, 81v, and 81w.

For example, to suppress the positional displacement and deflection between the bus bars 81n, 81u, 81v, and 81w, it is conceivable that positioning portions for positioning the bus bars 81n, 81u, 81v, and 81w are provided an outer surface of the bottom wall portion 77 of the housing 70. However, if the positioning portions are provided on the outer surface of the bottom wall portion 77, a thickness of the bottom wall portion 77 might increase to enlarge the housing 70 in the axial direction D1, which might increase the size of the electric pump 1 in the axial direction D1. Therefore, the increase in size of the electric pump 1 is also suppressed by not providing positioning portions on the bottom wall portion 77.

While the exemplary embodiments of the present invention have been illustrated in detail, the present invention is not limited to the above-mentioned embodiments, and other embodiments, variations and variations may be made without departing from the scope of the present invention.

Although the above electric pump 1 is for introducing and discharging a liquid, the present invention may be applied to an electric pump for introducing and discharging a gas as a fluid.

In the above present embodiment, the bottom wall portion 77 overlaps all of the divided coils 34 in the orthogonal direction D2, but is not limited thereto. The bottom wall portion 77 may overlap at least a part of the plurality of divided coils 34 in the orthogonal direction D2.

Although the insulating paper 100 is described as an example of an insulating member, it is not limited to the insulating paper 100. For example, the insulating member may be a thin sheet of rubber.

In the above present embodiment, the welding is resistance welding, but it is not limited thereto. The welding may be arc welding, electron beam welding, brazing, gas welding, explosion welding, ambient temperature pressure welding, friction welding, ultrasonic pressure welding, diffusion welding, or laser welding.

The ring portion 82v may include a retracted portion. The retracted portion may be provided with the hook portion 84v, face the retracted portion 87u, and be retracted radially inward therefrom. The ring portion 82w may include a retracted portion. The retracted portion may be provided with the hook portion 84w, face the retracted portion 87v, and be retracted radially inward therefrom.

What is claimed is:

1. A manufacturing method of an electric pump, the electric pump including:
   an impeller;
   a rotor connected to the impeller;
   a housing housing the rotor;
   a stator surrounding an outer surface of the housing; and
   a bus bar unit,
   the bus bar unit including:
      a first ring portion formed into a substantial C shape;
      a second ring portion formed into a substantial C shape and located radially outward from the first ring portion;
      a plurality of connecting portions extending radially outward from the first ring portion and being connected to the second ring portion;
      a first hook portion extending radially outward from a radially outer periphery of the first ring portion, and curving to extend radially inward; and
      a second hook portion extending radially outward from a radially outer periphery of the second ring portion, and curving to extend radially inward,
   the stator including:
      a plurality of divided iron cores surrounding the outer surface of the housing;
      a plurality of divided coil bobbins respectively attached to the plurality of the divided iron cores; and
      a plurality of divided coils respectively wound around the plurality of the divided coil bobbins,
   the plurality of the divided coils including first and second divided coils,
   first and second extended portions respectively extended from the first and second divided coils,
   the manufacturing method comprising:
      engaging and welding the first and second extended portions with the first and second hooks, respectively, and
      cutting the plurality of the connecting portions after the engaging and welding.

2. The manufacturing method of the electric pump according to claim 1, wherein in the engaging and welding, respectively conductively connecting the first extended portion with the first hook portion, in a state where the bus bar unit is covered with an insulating sheet including a first opening exposing the first hook portion and where the first extended portion does not directly contact with the second ring portion through the insulating sheet.

3. The manufacturing method of the electric pump according to claim 1, wherein
   a plurality of the first hook portions are spaced away from each other in a first circumferential direction of the first ring portion,
   the first ring portion includes a first end in the first circumferential direction, and
   at least one of the connecting portions is close to the first end, as compared with one of the plurality of the first hook portions closest to the first end.

4. The manufacturing method of the electric pump according to claim 1, wherein
   a plurality of the second hook portions are spaced away from each other in a second circumferential direction of the second ring portion,
   the second ring portion includes a second end in the second circumferential direction, and
   at least one of the connecting portions is close to the second end, as compared with one of the plurality of the second hook portions closest to the second end.

5. The manufacturing method of the electric pump according to claim 1, wherein at least one of the connecting portions is provided between two of the first hook portions.

6. The manufacturing method of the electric pump according to claim 1, wherein at least one of the connecting portions is provided between two of the second hook portions.

7. The manufacturing method of the electric pump according to claim 1, wherein
   the first ring portion includes a first retracted portion, and
   the first retracted portion is provided with the first hook portion and is partially retracted radially inward from the second ring portion.

8. The manufacturing method of the electric pump according to claim 7, wherein the connecting portion is circumferentially spaced away from the first retracted portion.

9. The manufacturing method of the electric pump according to claim 1, wherein
the second ring portion includes a second retracted portion, and
the second retracted portion faces the first hook portion and is retracted radially outward from the first hook portion.

10. The manufacturing method of the electric pump according to claim 9, wherein the connecting portion is circumferentially spaced away from the second retracted portion.

* * * * *